UNITED STATES PATENT OFFICE.

MARY W. MONTGOMERY, OF NEW YORK, N. Y.

BEVERAGE-PRODUCING MATERIAL.

1,056,111. Specification of Letters Patent. Patented Mar. 18, 1913.

No Drawing. Application filed May 6, 1912. Serial No. 695,357.

*To all whom it may concern:*

Be it known that I, MARY W. MONTGOMERY, a citizen of the United States, residing in the city of New York, borough of Manhattan, and county of New York, State of New York, have invented certain new and useful Improvements in Beverage-Producing Materials, of which the following is a full, clear, and exact specification.

My invention consists in the production of a beverage producing material by the proper treatment of the roots of the vegetable genus *Dioscorea* and the process of producing the same.

I have discovered that the roots of the several species of the above mentioned genus can be converted into a material capable of producing beverages of a pleasant taste, being easily digestible and possessing beneficial medicinal properties.

The broad principle of my invention is to thoroughly dry the tuberous roots, and then roast them into a condition from which they may be readily ground into a fine powder. The beverage may be obtained by treating the above powder with hot water, thus producing a decoction of any required degree of concentration. The method of producing the powder from the tuberous roots may be varied, but the following is the best process known to be at present: The tubers are thoroughly cleaned and then cut or broken into small pieces, preferably slices, and dried at a temperature of about 200° F. until all or most of the moisture has been removed and the slices are in a crisp condition. They are then roasted at a temperature sufficiently high to drive off any remaining moisture, and to convert the tuber slices into a hard brown roasted condition. The roasted material may be broken into pieces or ground into powder as desired. The drying and roasting processes may be conducted upon shelves, rotary roasters or by any other means that will produce the same result.

I do not limit myself to the size of the tuber pieces, the temperatures given, nor the physical size of the resultant material, all of which may be varied without going beyond the scope of my invention, which consists in a dried and roasted product produced from the vegetable genus *Dioscorea*, and suitable for the production of beverages, and the process of producing said material.

Having thus described my invention, what I claim is:

1. The process of producing a beverage producing material by drying and roasting the tuberous roots of the vegetable genus *Dioscorea*.

2. The process of producing a beverage producing material by drying the tuberous roots of the vegetable genus *Dioscorea* until the most of the moisture is removed, and then roasting the resultant product.

3. The process of producing a beverage producing material by drying the tuberous roots of the vegetable genus *Dioscorea* until practically free from moisture, roasting the resultant product and grinding to a powder.

4. A beverage producing material consisting of the dried and roasted tuberous roots of the vegetable genus *Dioscorea*.

5. The dried and roasted tuberous roots of the vegetable genus *Dioscorea* possessing medicinal properties.

6. The dried and roasted tuberous roots of the vegetable genus *Dioscorea* being in the form of a hard brittle dark colored substance possessing medicinal properties.

7. The dried and roasted tuberous roots of the vegetable genus *Dioscorea* possessing antispasmodic antirheumatic or diaphoretic properties.

MARY W. MONTGOMERY.

Witnesses:
 CHAS. LYON RUSSELL,
 HARRY C. HEBIG.